United States Patent
Sun et al.

(10) Patent No.: US 8,999,548 B2
(45) Date of Patent: Apr. 7, 2015

(54) LIQUID-COOLED BATTERY MODULE

(71) Applicant: GM Global Technology Operations LLC, Detroit, MI (US)

(72) Inventors: Hongguang Sun, Whitby (CA); Regan P. Dixon, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 13/798,893

(22) Filed: Mar. 13, 2013

(65) Prior Publication Data

US 2014/0272513 A1      Sep. 18, 2014

(51) Int. Cl.
| | | |
|---|---|---|
| H01M 10/50 | (2006.01) | |
| H01M 10/6556 | (2014.01) | |
| H01M 10/613 | (2014.01) | |
| H01M 10/617 | (2014.01) | |
| H01M 10/625 | (2014.01) | |
| H01M 10/647 | (2014.01) | |
| H01M 10/6567 | (2014.01) | |
| H01M 2/10 | (2006.01) | |

(52) U.S. Cl.
CPC ...... *H01M 10/5057* (2013.01); *Y10T 29/49108* (2015.01); *H01M 2/1077* (2013.01); *H01M 10/5004* (2013.01); *H01M 10/5008* (2013.01); *H01M 10/5016* (2013.01); *H01M 10/5032* (2013.01); *H01M 10/5075* (2013.01)

(58) Field of Classification Search
CPC ....................................... H01M 10/50–10/5097
USPC ............................................................ 429/120
See application file for complete search history.

(56) References Cited

U.S. PATENT DOCUMENTS

2010/0279152 A1*   11/2010   Payne ............................ 429/50

* cited by examiner

*Primary Examiner* — Kenneth Douyette
*Assistant Examiner* — James Lee
(74) *Attorney, Agent, or Firm* — Dinsmore & Shohl LLP

(57) ABSTRACT

A battery module having a cooling plate assembly made from two non-contiguous cooling plates is provided. Each cooling plate has a side panel contiguous with a base panel, and the cooling plates are disposed opposite one another such that the base panels are coplanar and separated by a gap. An inlet duct runs along an upper edge of each side panel, and a manifold having coolant channels in fluid communication with the inlet duct is located in each side panel. The base panels have an outlet duct in fluid communication with the manifold. The cooling plate is designed to decrease friction loss as coolant flows through the inlet duct, manifold and outlet cut, and coolant channels in the manifold are designed to maintain a uniform flow rate across the manifold. Individual cells are disposed in the assembly such that the cell sides and bottoms are in heat-transfer contact with the plate side and base panels, respectively. The design of the battery module reduces operational temperature variation in the cells across the battery module and within each battery cell. Methods for reducing coolant flow friction loss, for establishing a more uniform coolant flow rate, and for reducing temperature variation are also provided.

12 Claims, 4 Drawing Sheets

LIQUID-COOLED BATTERY MODULE

TECHNICAL FIELD

The present disclosure relates to modules for lithium-ion and related batteries, and more specifically to cooling plate systems for battery modules which reduce temperature variation across the module and within individual battery cells.

BACKGROUND

Lithium-ion and related batteries, collectively known as a rechargeable energy storage system (RESS), continue to be considered a clean, efficient, and environmentally responsible power source for electric vehicles and various other applications. In particular RESS technologies are being used in automotive applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes batteries ideal to serve as part of a propulsion system for cars, trucks, buses, motorcycles and related vehicular platforms. In the present context, a cell is a single electrochemical unit, whereas a battery pack is made up of one or more cells joined in series, parallel or both, depending on desired output voltage and capacity.

Battery temperature significantly affects the performance, safety, and life of lithium ion batteries in hybrid vehicles under differing driving conditions. Uneven temperature distribution in the battery pack can lead to electrically unbalanced modules, and consequently to lower performance and shorter battery life. As a result, thermal management for lithium ion batteries is receiving increased attention from automobile manufacturers and battery suppliers. Major thermal concerns of a battery pack are overheating and uneven heating within each individual battery cell and across the entire battery pack during operational charge/discharge cycles, which can lead to fast battery degradation and capacity reduction of battery cells. Maintaining a uniform temperature within the battery cell is difficult because of non-uniform heat generation within the battery cell. In addition, the heating and cooling systems can produce non-uniform heat transfer because of their internal thermal resistance. Battery pack designs in which battery cells operate in controlled temperature ranges are desirable.

The convection heat transfer rate of battery cooling plate surfaces and battery heat generation rate are the two major parameters that affect the temperature of battery cells. The generation of propulsive power from the RESS also produces significant thermal loads. As such, a RESS-based system preferably includes a cooling system to avoid unacceptably high levels of heat being imparted to the batteries and ancillary equipment. Keeping excess heat away from these, as well as other, thermally-sensitive components helps to promote their proper operation and long life. In one particular form, such a cooling system may include the passive or active circulation of a liquid coolant in, around or otherwise thermally adjacent to the batteries or other heat-generating components.

Li-ion high-performance batteries are used in hybrid powertrains exhibiting exceptionally high dynamics. At times of momentary peak load, e.g. when braking (recovery (recuperation) of brake energy) and accelerating (assisted acceleration (boosting)), batteries must generate a high output within a very short time. These momentary peak load periods generate powerful electrical currents, causing significant warming of the Li-ion cells due to internal resistance. At around 95 percent, charging and discharging efficiency is very high; however, the resulting waste heat cannot be ignored. Coupled with the fact that, in the warmer weather and in warmer climates in particular, the temperature of the vehicle interior can rise to well in excess of 40° C., operating Li-ion batteries without cooling is not an option.

A primary challenge to any battery module cooling system is to provide uniform heat-transfer from the cells so that temperature variation across the pack and within a cell is kept to a minimum. Various cooling systems dependent on circulating coolant via coolant channels in cooling plates which are in contact with the battery cells are known in the art. The current generation of cooling systems relies on single plates which circulate coolant in a U-shaped flow, having inlet and outlet ports on the same side of the plate. As the coolant traverses the plate, however, the heat transferred from the cells reduces the heat-transfer rate of the coolant and heat transfer is not uniform. Further, the friction losses in the inlet duct and outlet duct, and head loss due to flow separation at the approximately 90° cooling plate bend, cause the flow rates of coolant channels at the front end or inlet/outlet side to be higher than the flow rates of coolant channels at the back end, which results in non-uniform heat transfer rates from the front to the back.

Within individual cells unacceptably high temperatures may occur due to temperature variation based on cooling plate contact where cooling is insufficient or non-uniform. At high temperatures, the battery cells degrade more rapidly and their performance and capacity is reduced. As a result, cells may fail to achieve the prescribed ten-year life span. A possible alternative is to deactivate the batteries when temperatures exceed a set limit. All the advantages of the hybrid vehicle, however—electric boosting or recuperation of brake energy—would then be lost. For vehicles that run solely on electric power, this would even be impossible, since Li-ion batteries are the sole energy source.

Therefore, it is desirable to produce a battery module cooling system which reduces pressure drop and friction loss, and which maintains a substantially uniform coolant flow rate across the module, and which therefore reduces temperature variation across the battery pack as well as within individual battery cells.

SUMMARY OF THE INVENTION

Accordingly, the present invention provides battery module cooling systems which reduce temperature variation in battery cells and maximum battery cell temperature across the module, reduce temperature variation within an individual cell, and which reduce total pressure drop of the battery cooling system.

One embodiment is directed to a battery module having a plurality of interconnected electrochemical cells disposed within a cooling plate assembly. The cooling plate assembly comprises two non-contiguous cooling plates and each cooling plate comprises a side panel contiguous with a base panel. The cooling plates are disposed opposite one another such that the base panels are coplanar and separated by a gap. Each side panel comprises an inlet duct running across the battery module from front to back along an upper edge of the side panel, and a manifold comprising coolant channels in fluid communication with the inlet duct. Each base panel comprises an outlet duct in fluid communication with a manifold; each cell having a top portion, a bottom portion, and two side portions, the cells being in parallel alignment in the cooling plate assembly such that the side portions are in heat-transfer contact with the manifolds, the bottom portions are in heat-transfer contact with the outlet ducts, and the upper edges of the side panels extend above the top portions of the cells; each inlet duct comprising at least one inlet port at the front, and each outlet duct section comprising at least one outlet port at the front; wherein the coolant channels and ducts are configured to reduce operational temperature variation in the cells across the battery module from front to back, and within each battery cell from top to bottom. According to specific embodiments, the channels and ducts may be configured to reduce friction loss at the inlet and outlet ducts and head loss at the cooling plate bend, thereby maintaining a more uniform coolant flow rate and more uniform heat transfer rate across the module and within individual cells. In particular embodiments, the cooling plate comprises three aluminum sheets, an inner sheet, an outer sheet, and a corrugated aluminum sheet interposed between the inner and outer sheets, wherein the corrugations form coolant flow channels in the manifold. The coolant channels and ducts may be configured by adjusting the relative cross-sectional area of the inlet duct, manifold and outlet duct, and by tapering or otherwise shaping corrugations within the coolant channels to provide greater cross-sectional area to the tops of the coolant channels located near the back end of the manifold, relative to the front end.

Another embodiment is directed to a cooling plate assembly for a battery module. The cooling plate comprises two non-contiguous cooling plates situated in a metal frame, and each cooling plate comprises a side panel contiguous with a base panel. The two plates are disposed opposite one another such that the base panels are coplanar and separated by a gap. Each side panel comprises an inlet duct running across the battery module from front end to back end along an upper edge of the side panel, and a manifold comprising coolant channels in fluid communication with the inlet duct. Each base panel comprises an outlet duct in fluid communication with a manifold; each inlet duct comprising at least one inlet port at the front end, and each outlet duct comprising at least one outlet port at the front end. The cooling plates each comprise three aluminum sheets, an inner sheet, an outer sheet, and a corrugated aluminum sheet interposed between the inner and outer sheets, wherein the corrugations form coolant flow channels in the manifold, and wherein corrugations are tapered or curved so that a cross-sectional area of the tops of one or more coolant channels at the back end is greater than a cross-sectional area of the tops of one or more coolant channels at the front end.

Other embodiments are directed to methods for reducing temperature variation across a battery pack/module and within individual cells of the pack/module, by constructing and/or implementing battery modules and cooling plate systems according to embodiments of the invention.

These and other advantages, embodiments and details may be more readily understood by reference to the drawings and detailed description set forth below.

BRIEF DESCRIPTION OF THE FIGURES

While the specification concludes with claims that particularly point out and distinctly claim embodiments of the invention, it is believed the present invention will be better understood from the following description of certain examples taken in conjunction with the accompanying drawings. In the drawings, like numerals represent like elements throughout the several views, and various components of the drawings are not necessarily illustrated to scale.

DETAILED DESCRIPTION

Figure 1A:
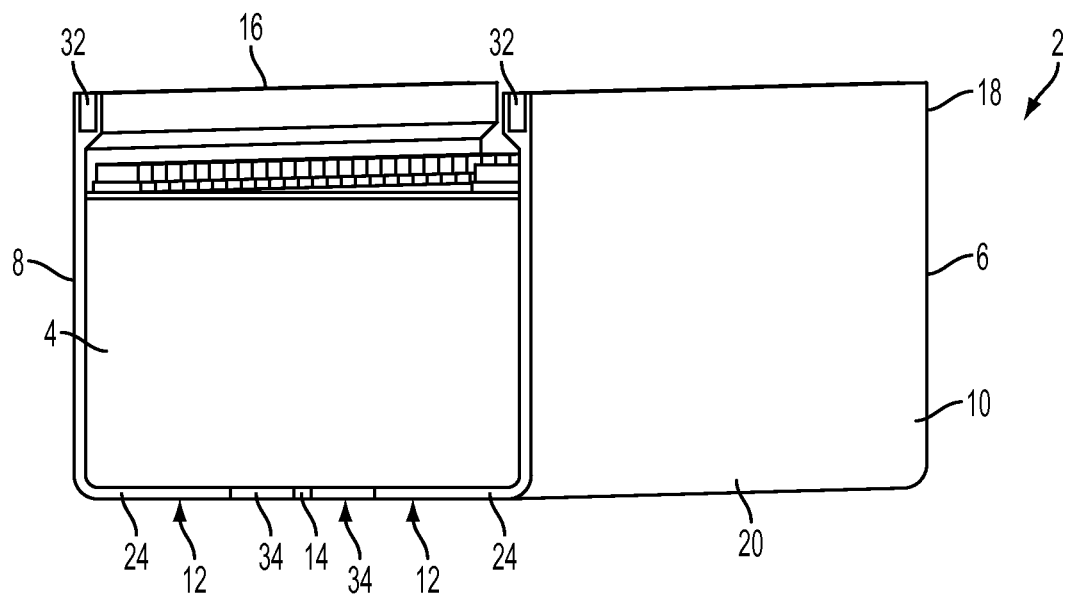
FIG. 1A depicts a schematic illustrative embodiment of a battery module.

The present invention will now be described more fully hereinafter with reference to the accompanying drawings, in which exemplary embodiments of the invention are shown. The present invention may, however, be embodied in many different forms and should not be construed as being limited to the embodiments set forth herein. In other words, the present invention may be changed or modified using equivalents or substitutes without departing from the scope and spirit of the invention. In the following description, it is to be noted that, when the functions of conventional elements and the detailed description of elements related with the present invention may make the gist of the present invention unclear, a detailed description of those elements will be omitted.

It will be understood that although the terms "first," "second," etc. may be used herein to describe various elements, these elements should not be limited by these terms. These terms are only used to distinguish one element from another element.

Further, it is noted that the terminology used herein is for the purpose of describing particular embodiments only and is not intended to limit the invention. As used herein, the singular forms are intended to include the plural forms as well, unless the context clearly indicates otherwise. It will be further understood that the terms "comprises" and/or "comprising," or "includes" and/or "including," when used in this specification, specify the presence of stated features, integers, steps, operations, elements, components and/or groups thereof, but do not preclude the presence or addition of one or more other features, integers, steps, operations, elements, components and/or groups thereof.

The present invention provides battery modules, cooling plate assemblies, and methods which substantially overcome the well-known problem of unacceptable operational temperature variation across the battery module and within an individual battery cell.

Reference will now be made in greater detail to a battery module according to an embodiment of the present invention, exemplary embodiments of which are illustrated in the accompanying drawings. The same reference numerals will be used throughout the drawings and the description to refer to the same or like parts and the repeated description of the same or like parts may be omitted.

Figure 1B:
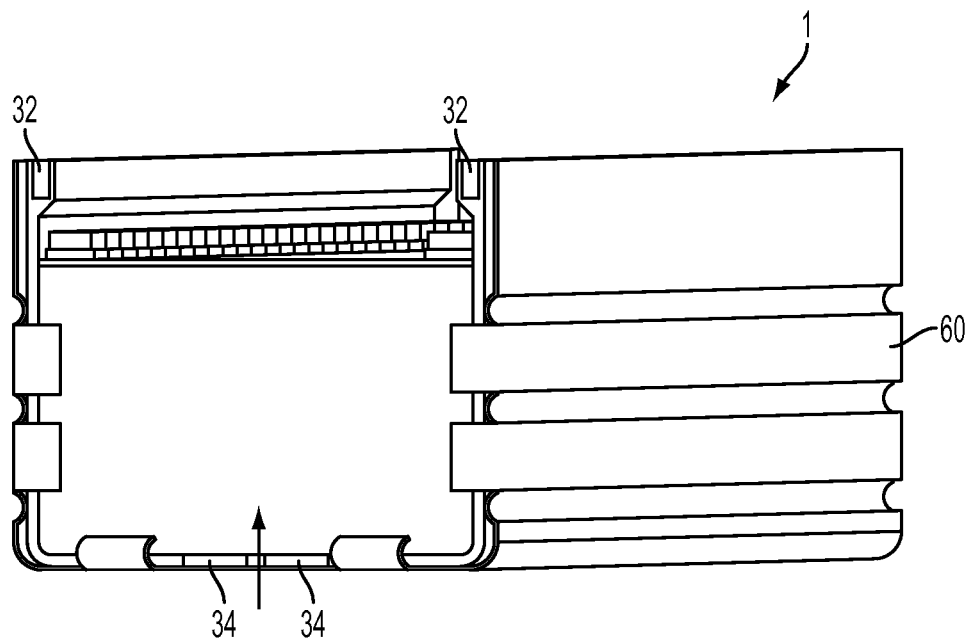
FIG. 1B is a schematic depiction of a battery module situated within a metal frame.
Figure 2A:
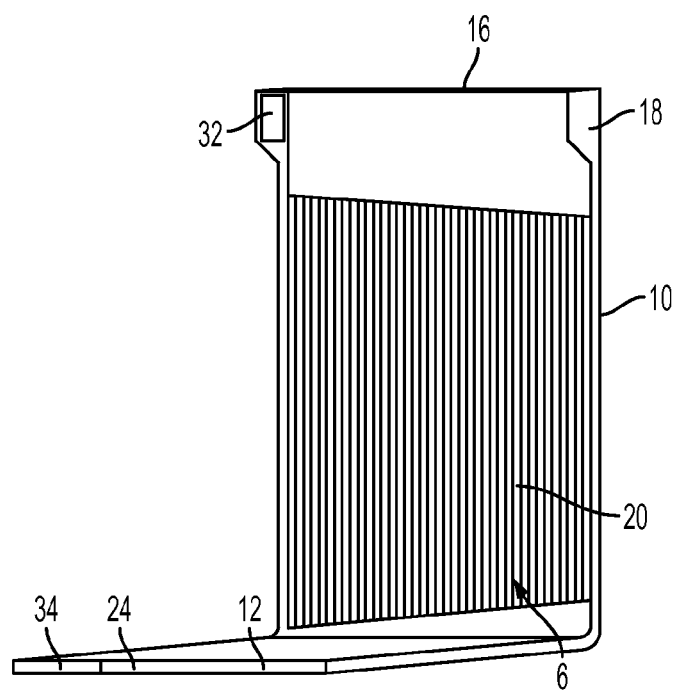
FIG. 2A illustrates an individual cooling plate embodiment showing relative locations of ducts, ports and manifold cooling channels in a front to back orientation.
Figure 2B:
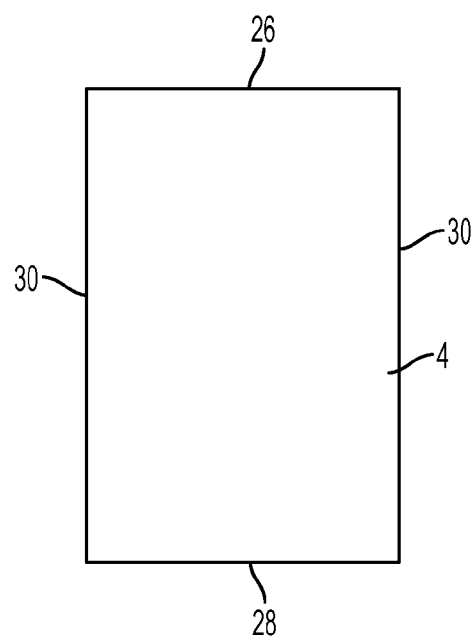
FIG. 2B depicts a schematic view of an individual cell for purposes of illustration top, side and bottom portion locations relative to position in the battery module.

Referring to FIGS. 1 and 2, a battery module 1 having a plurality of interconnected electrochemical cells 4 disposed within a cooling plate assembly 2 comprising two non-contiguous cooling plates 6, 8 is depicted. The present inventors discovered that using two noncontiguous cooling plates instead of a single cooling plate, enables contact pressure between the cells and cooling plate to be adjusted to variable tolerances. Proper contact pressure at each side of the battery pack of cells is essential to uniform heat transfer. In a plate of fixed dimension, tolerances are difficult to accommodate. As a non-limiting example, a thin layer of soft silicone foil with high thermal conductivity may be placed between cooling plate and battery cells to ensure the full contact if necessary. Each cooling plate 6, 8 comprises a side panel 10 contiguous with a base panel 12. The base panel provides additional heat transfer at the bottom portions of the cells, which also promotes uniform heat transfer and therefore uniformity of temperature within each cell. The cooling plates 6, 8 disposed opposite one another such that the base panels 12 are coplanar and separated by a gap 14. The gap may be narrowed or widened when adjusting the cooling plate assembly to provide uniform heat transfer contact at each side of the cell. Each side panel 10 comprises an inlet duct 16 running across the battery module 1 from front to back along an upper edge 18 of the side panel 10, and a manifold 20 comprising coolant channels 22 in fluid communication with the inlet duct 16. Each base panel 12 comprises an outlet duct 24 in fluid communication with a manifold 20. Each individual cell 4 has a top portion 26, a bottom portion 28, and two side portions 30, and the cells are arranged in parallel alignment in the cooling plate assembly 2 such that the side portions 30 are in heat-transfer contact with a manifold 20, and the bottom portions 28 are in heat-transfer contact with an outlet duct 24. The upper edges 18 of the side panels 10 extend above the top portions 26 of the cells 4. Each inlet duct 16 comprises at least one inlet port 32 at the front, and each outlet duct 24 comprises at least one outlet port 34 at the front; wherein the coolant channels 22 and ducts 16, 24 are configured to reduce operational temperature variation in the cells 4 across the battery module 1 from front to back, and within each battery cell 4 from top 26 to bottom 28.

Generally, rechargable battery cell types include round cells, prismatic cells and pouch or coffee bag cells. The geometry of a prismatic cell is typically rectangular and the cell may be flat-packed, for example in rectangular aluminum housing. In pouch or coffee bag cells, the individual layers of active material are stacked or folded and packaged in, for example, a flexible aluminum composite film. Practically, for cooling efficiencies, prismatic or pouch cells are most suitable for use in vehicles. A preferred battery cell type in accordance with embodiments of the invention is a prismatic cell. The metal can disposed about the cell provides a contact surface for the cooling plate at the cell sides and bottom portions, which provides greater opportunity for thermal management.

The inventive battery module is uniquely designed to provide overall uniform heat transfer. Conventional designs lack uniformity across the module from front to back (along the parallel alignment of cells), and further lack uniformity within each individual cell, where typically heat transfer is reduced from a top portion to a bottom portion of the cell. In order to achieve substantially uniform heat transfer across the module it is important to achieve a substantially uniform coolant flow rate of coolant channels from front end to the back end.

Due to friction losses at the inlet and outlet ducts and head loss at the cooling plate bend, flow velocity slows down such that flow velocity in channels nearer the front end is greater than coolant flow velocity in coolant channels nearer the back end.

Head loss is defined as the total energy loss per unit mass. It is equal to total pressure drop multiplied by fluid density given constant fluid height. Head loss due to friction is referred to specifically as friction loss. Head loss also occurs with flow through an angled pipe or duct, or sudden expansion/contraction in flow.

Each cooling plate 6, 8 comprises three aluminum sheets, an inner sheet 35, an outer sheet 36, and a corrugated aluminum sheet 38 interposed between the inner 35 and outer sheets 36, wherein the corrugations 40 form coolant flow channels 22 in the manifold 20. The manifold may be formed, for example, using an aluminum corrugation and two aluminum plate to reduce the cost. Presence, shape and/or thickness of corrugation can be manipulated to affect flow rate through a channel. According to preferred embodiments, the corrugations may be present in the cooling channels of the manifold, but not in the inlet or outlet ducts. Temperature variation may be reduced by configuring the cooling channels 22 and ducts 16, 24 to provide substantially uniform heat transfer from the side portions 30 of the cells 4 to the cooling plate 6, 8 across the battery module 1 from front to back, and to provide substantially uniform heat transfer from each battery cell 4 to the cooling plate 6, 8 from the top portion 26 to the bottom portion 28, and from side portion 30 to side portion 30. The preferred coolant comprises a liquid.

In typical battery modules known in the art, a cooling plate may be disposed along each side of an alignment of battery cells, with each plate manifold having cell channels which predominantly direct flow from an inlet port at the front top to an outlet port at the front bottom. As a result, the friction losses in the inlet duct and outlet duct, and head loss due to flow separation at the 90° cooling plate bend, cause the coolant flow rate in channels nearer to the ports (front end) to be greater than the flow rate in channels nearer to the back end.

According to embodiments of the invention, configurations to the channels may be made to reduce the friction losses in inlet duct and outlet duct and head loss at the (90°) cooling plate bend. Friction loss at the outlet duct is proportional to flow velocity^2 thereof. The coolant flow rate is equal to flow velocity multiplied by cross-sectional area. Given that the flow rate at the outlet port is controlled, increasing a cross-section of the outlet duct relative to the manifold cooling channels decreases the flow velocity at the outlet duct, which results in a substantial decrease in friction loss at the outlet duct. Accordingly, the variation of the flow rate of coolant channels from the front to the back of the module is reduced. The head loss at the 90° cooling plate bend is proportional to the sum of the square of flow velocity of individual coolant channels. Therefore, the uniformity of flow rate of coolant channels reduces the head loss at the 90° cooling plate bend. The reduction of the head loss at the 90° cooling plate bend, on the other hand, further decreases the variation of the flow rate of coolant channels through the module.

In specific embodiments, coolant channels 22 may be configured to substantially reduce friction loss at inlet duct 16, friction loss at outlet duct 24, and head loss at the 90° cooling plate bend. In particular, the difference in pressure at the top 50 and bottom 52 of a channel in channels across the manifold from the front end 54 to the back end 56 may be reduced. In specific embodiments, coolant channels 22 may be configured to reduce pressure at the bottom 52 of coolant channels at the back end 56 of the manifold 20.

Figure 3A:
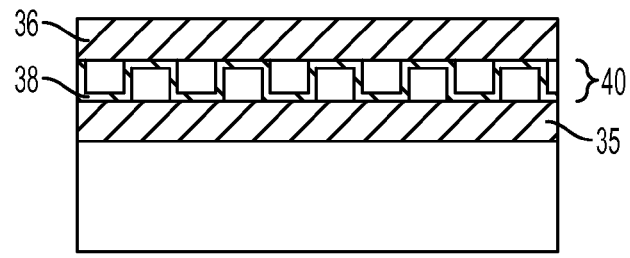
FIG. 3A sets forth a schematic cross-sectional view of the inner, outer, and corrugated layers which make up a cooling plate and channels therein.
Figure 3B:
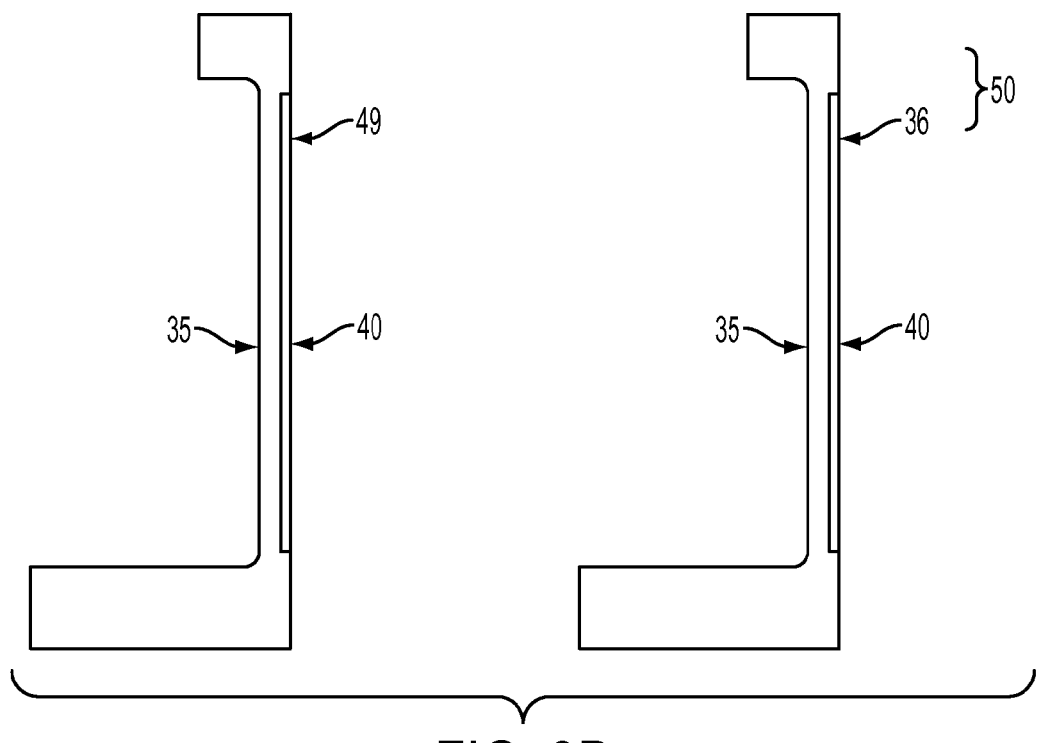
FIG. 3B depicts a cross-section of an individual cooling channel located nearer the front end of the manifold, and a cross-section of an individual cooling channel located nearer the back end of the manifold, to illustrate how corrugation may be tapered to provide greater cross-sectional area at the top of the channel nearer the back end.
Figure 4:
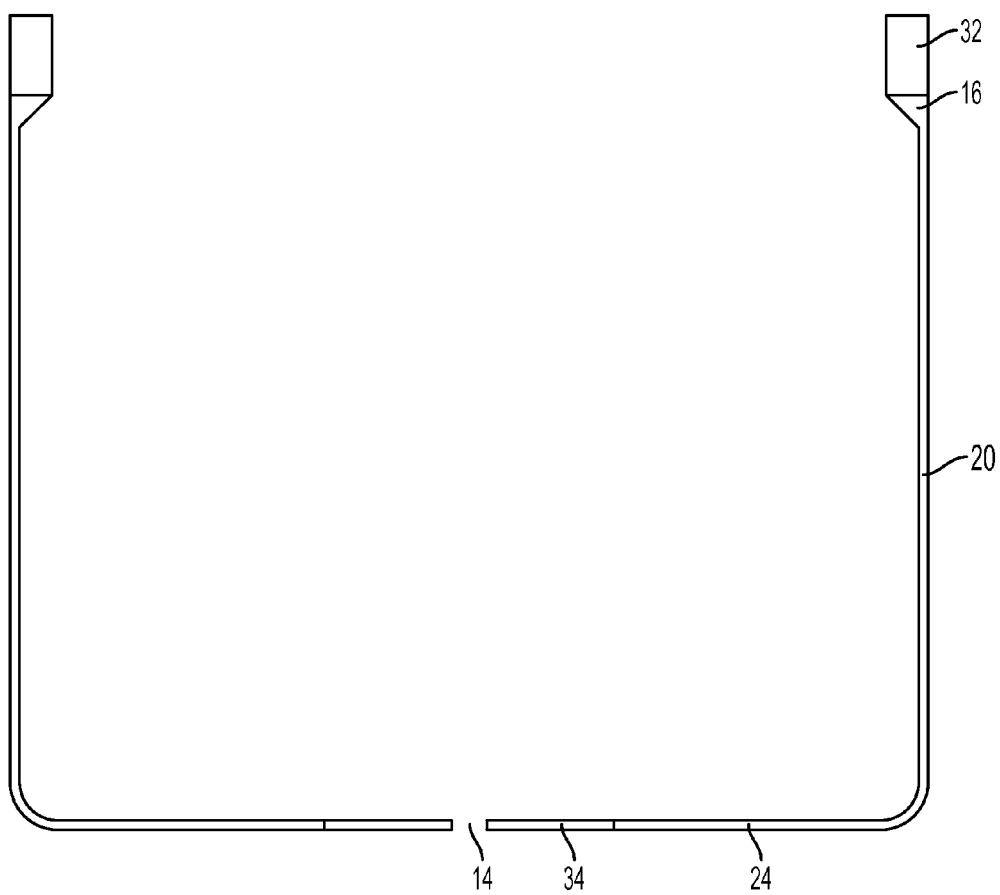
FIG. 4 depicts a cross-sectional view of the orientation of two individual cooling plates within a cooling plate system, and relative cross-sectional areas of the inlet duct, manifold, and outlet duct according to certain embodiments.

With reference in particular to FIG. 3, in further embodiments, the middle sheet 38 of the cooling plate 22 comprises corrugations 40 and the corrugations may be used to alter the vertical cross-sectional areas of flow channels 22. Specifically, the corrugations may be used to increase cross-sectional areas at the tops of flow channels located nearer the back end 56, relative to the front end 54. In preferred embodiments, corrugation is only installed in the manifold 20 and does not extend into the inlet or outlet ducts. Tapered, curved, or formed corrugations may be used to increase the cross-sectional area or decrease the flow velocity at the tops of the flow channels nearer the back end relative to the front end, which results in the decrease of the friction loss the tops of the flow channels nearer the back end and the net effect of increasing the coolant flow rate in channels nearer the back end. Therefore, the flow rates through individual channels across the module are substantially uniform and the total pressure drop of entire cooling system is further reduced. Specifically, embodiments are provided wherein the corrugations 40 are tapered or curved so that a cross-sectional area of the top(s) 50 of one or more individual coolant channels at the back end 56 is greater than a cross-sectional area of the top(s) 50 of one or more individual coolant channels at the front end 54, and more specifically, corrugations 40 may be tapered or curved to reduce friction loss at the top(s) of one or more coolant channels at the back end 56 and further equalize coolant flow rates through individual channels 22 across the module. The cross-sectional areas of a middle portion 51 of a cooling channel 22 and cross-sectional area at a bottom portion 52 of a cooling channel may be the same in each channel from the front end 54 across the back end 56 of the manifold 20.

Coolant channels 22 and ducts 16, 24 may be configured to adjust coolant flow velocity to reduce frictional losses at the inlet duct 16 and outlet duct 24, and head loss due to flow separation at the 90° cooling plate bend, which substantially equalizes coolant flow rates through individual channels across the module, and substantially reduces the total pressure drop of cooling system. According to some embodiments, a transverse cross sectional area of the outlet duct 24 is greater than a transverse cross sectional area of the manifold 20 such that coolant flow decelerates from the manifold 20 to the outlet duct 24. In some embodiments a transverse cross-sectional area of the inlet duct 16 is greater than a transverse cross-sectional area of the manifold 20, such that coolant flow accelerates from the inlet duct 16 to the manifold 20.

The cooling plate assembly 2 is situated within a metal frame 60, typically constructed from steel, which includes mechanisms for adjusting the positioning of the plates to optimize heat-transfer contact with the cells 4, in particular at the cell sides. The distance between the two plates of the cooling plate assembly may be adjusted through narrowing or widening the gap 14 between the edges of the base plate 12. The metal frame 60 may comprise adjustment mechanisms for positioning the cooling plates. By employing two cooling plates 6, 8 there is an increased ability to adjust contact points with the cell sides since each side may be adjusted independent of the other.

Other embodiments are directed specifically to the cooling plate assembly as described, or even more specifically to one of the cooling plate components.

Additional embodiments provide methods for reducing operational temperature variation across a plurality of electrochemical cells 4 aligned in parallel from front to back of a battery module 1, and/or for reducing operational temperature within each battery cell 4 from top to bottom in a battery module 1 comprising a plurality of electrochemical cells 4. In particular the methods comprise constructing or installing the battery module with the cooling plate assembly as described, and in very specific embodiments the methods comprise installing an embodiment of the battery module with the cooling assembly in a hybrid or electric vehicle.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A battery module having a plurality of interconnected electrochemical cells disposed within a cooling plate assembly comprising two non-contiguous cooling plates, each cooling plate comprising a side panel contiguous with a base panel, the cooling plates disposed opposite one another such that the base panels are coplanar and separated by a gap, each side panel comprising an inlet duct running across the battery module from front to back along an upper edge of the side panel, and a manifold comprising coolant channels in fluid communication with the inlet duct, and each base panel comprising an outlet duct in fluid communication with a manifold; each cell having a top portion, a bottom portion, and two side portions, the cells being in parallel alignment in the cooling plate assembly such that the side portions are in heat-transfer contact with the manifolds, the bottom portions are in heat-transfer contact with the outlet ducts, and the upper edges of the side panels extend above the top portions of the cells; each inlet duct comprising at least one inlet port at the front, and each outlet duct comprising at least one outlet port at the front; wherein the coolant channels and ducts are configured to reduce operational temperature variation in the cells across the battery module from front to back, and within each battery cell from top to bottom.

2. The battery module according to claim 1, wherein each cooling plate comprises three aluminum sheets, an inner sheet, an outer sheet, and a corrugated aluminum sheet interposed between the inner and outer sheets, wherein the corrugations form coolant flow channels in the manifold.

3. The battery module according to claim 2, wherein temperature variation is reduced by configuring the cooling channels and ducts to provide substantially uniform heat transfer from the side and bottom portions of the cells to the cooling plate across the battery module from front to back, and to provide substantially uniform heat transfer from each battery cell to the cooling plate.

4. The battery module according to claim 1, wherein the coolant comprises a liquid.

5. The battery module according to claim 3, wherein coolant channels and ducts are configured to adjust coolant flow velocity to reduce friction loss at both the inlet ducts and the outlet ducts and head loss at a cooling plate bend and substantially equalize coolant flow rates through individual channels across the module.

6. The battery module according to claim 5, wherein a transverse cross sectional area of the outlet duct is greater than a transverse cross sectional area of the manifold such that coolant flow decelerates from the manifold to the outlet duct.

7. The battery module according to claim 6, wherein a transverse cross-sectional area of the inlet duct is greater than a transverse cross-sectional area of the manifold, such that coolant flow accelerates from the inlet duct to the manifold.

8. The battery module according to claim 2, wherein the corrugations are tapered or curved so that a cross-sectional area of the tops of one or more coolant channels at the back end is greater than a cross-sectional area of the tops of one or more coolant channels at the front end.

9. The battery module according to claim 8, wherein the corrugations are tapered or curved to reduce friction loss at the top of one or more coolant channels at the back end and further equalize coolant flow rates through individual channels across the module.

10. The battery module according to claim 9, wherein cross-sectional areas of a middle portion of a cooling channel and cross-sectional area at a bottom portion of a cooling channel are the same in each channel from the front end across the back end of the manifold.

11. The battery module according to claim 1, wherein the gap may be narrowed or widened to effectuate appropriate contact pressure between the cooling plates and the battery cells.

12. The battery module according to claim 11, wherein the cooling plate assembly is situated within an adjustable metal frame.

* * * * *